Aug. 4, 1959  W. F. HANNY  2,898,000
O-RING PRESSURE SEAL
Filed Jan. 30, 1957

INVENTOR
WILLIAM F. HANNY
BY M. B. Tasker
ATTORNEY

United States Patent Office 2,898,000
Patented Aug. 4, 1959

2,898,000

O-RING PRESSURE SEAL

William F. Hanny, Torrington, Conn., assignor to United Aircraft Corporation, East Hartford, Conn., a corporation of Delaware Application January 30, 1957, Serial No. 637,223

4 Claims. (Cl. 220—46)

This invention relates to sealing structures and more particularly to a sealing ring for use between two parts, for example, a vessel and its cover, between which a fluid type connection must be maintained.

One object of this invention is to provide a sealing ring structure between two connected parts which is capable of maintaining a fluid type seal between the parts under conditions of extremely high temperature and pressure.

Another object of the invention is to provide such a sealing ring structure capable of confining liquid and gases which are corrosive in nature under conditions of high temperature and pressure.

Another object of the invention is to provide a sealing ring which makes resilient engagement between the parts to be sealed and which is repeatedly reusable.

A still further object of the invention is to provide a resilient metal sealing ring which makes pressure contact with each of the connected parts at a plurality of annular zones of engagement.

A yet further object of the invention is generally to improve fluid seals.

These and other objects and advantages of the invention will be pointed out or will be obvious from the following detailed description of a preferred embodiment of the invention shown in the accompanying drawing.

Figure 1:
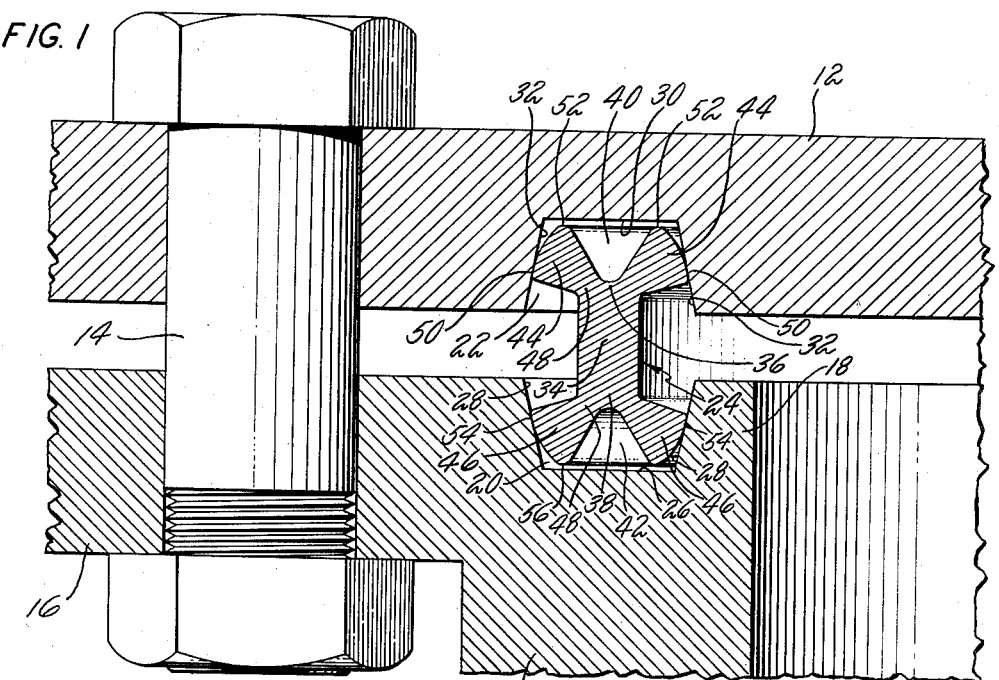
Figure 2:
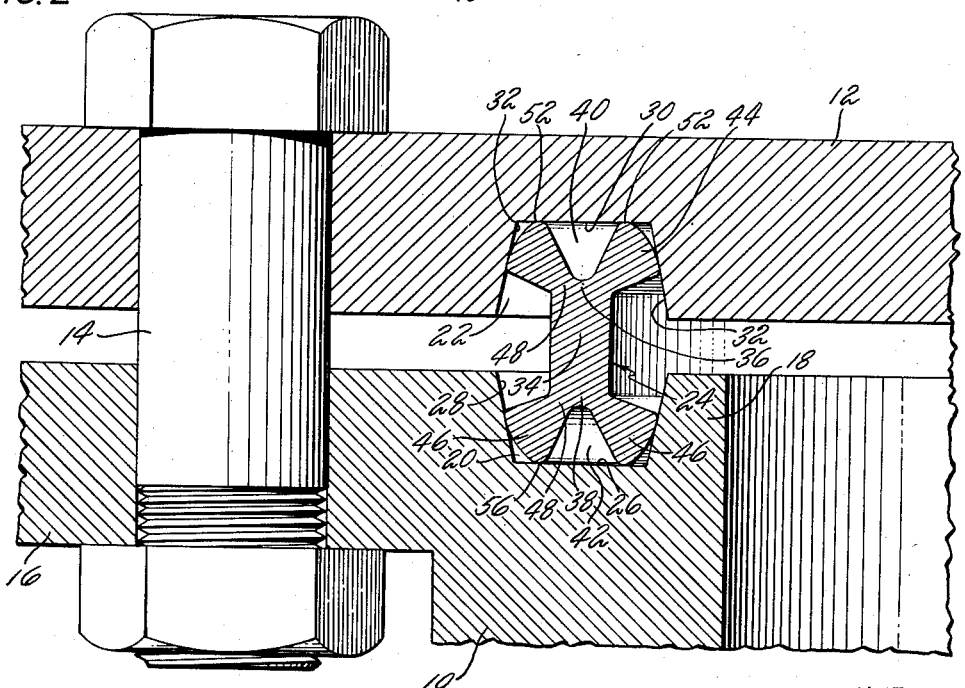

In the drawing, Fig. 1 is a fragmentary vertical section through a fluid containing vessel and its cover having the sealing ring structure of this invention, shown prior to tightening the hold down bolts for the cover; and Fig. 2 is a similar view showing the sealing engagement of the ring with the connected parts after the hold down bolts have been tightened.

As shown in the drawing, an annular fluid containing vessel 10 has a cover 12 which is adapted to be secured to the vessel by a plurality of annularly arranged hold down bolts 14 which extend through the cover and through a parallel flange 16 on the vessel. The upper side wall 18 of the vessel is provided with an annular groove 20, and the cover 12 is provided with a like groove 22 which confronts the groove 20 in which the sealing ring 24 is disposed.

The groove in vessel 10 has a horizontal bottom wall 26 and divergent side walls 28. Groove 22 in the cover likewise has horizontal bottom wall 30 and divergent side walls 32.

Sealing ring 24 has a web 34 which separates upper and lower somewhat bulbous ends 36 and 38 which lie in grooves 22 and 20 respectively. In section the ring generally resembles a dumbbell having enlarged end portions connected by the web 34. The ends of the sealing ring are provided with deep peripheral grooves, or recesses, 40 and 42 which divide the ring at its upper periphery into two lobes 44 and at its lower periphery into two lobes 46. It will be noted that the grooves 40 and 42, which lie in the vertical planes of the web 24, are in the shape of a broad V which extends down almost into the web 34. As a result, the lobes 44 and 46 have portions 48 of reduced dimensions connecting them to the web, thus providing a resilient support for the lobes on the web 24.

In the position of the parts shown in Fig. 1 before the hold down bolts 14 are tightened, the lobes 44 are in engagement with side walls 32 of groove 22 at points 50, thus providing two annular zones of engagement between the lobes 44 and the cover 12 about midway along the length of the diverging side walls 32 of the groove. The points 52 of lobes 44 are out of contact with and are somewhat spaced from the bottom 30 of groove 22. Similarly, lobes 46 engage side walls 28 of groove 20 about midway of the length of the side walls thereof at points 54 to provide two annular areas of engagement between these lobes and the side walls of the groove. Points 56 of lobes 46, however, are free from engagement with and are spaced from the bottom wall 26 of groove 20.

With the sealing ring assembled between the vessel and its cover, as shown in Fig. 1, it will be evident that when the hold down bolts 14 are tightened by rotating the nuts 58 in a tightening direction, the lobes 44 and 46 will be forced into their respective grooves to provide an enhanced pressure resisting seal between the lobes and the side walls of the grooves. Bolts 14 are tightened until the rims 52 and 56 of the lobes are forcibly seated on bottom walls 30 and 26 of the grooves, resulting in the formation of a second annular area of sealing engagement between each of the rims 52 and 56 of the respective lobes 44 and 46 with the bottoms 30 and 26 of grooves 22 and 20, as is shown most clearly in Fig. 2. This movement of the lobes into engagement with the groove bottoms is possible due to the resilience of portions 48 of the lobes adjacent web 34. While the rims of the lobes have been shown in engagement with the bottoms of the grooves, it will be understood that an effective seal will result from the engagement of the lobes with the sides of the groove even if no engagement with the groove bottoms occurs.

It will thus be evident that as a result of the tightening of bolts 14 four separate annular areas of pressure engagement result between the sealing ring and the cover and also between the sealing ring and the vessel. It will further be evident that since these annular areas of pressure engagement are obtained by resilience of the lobes 44 and 46, a seal is maintained at these areas even though the container parts and the sealing ring may expand and contract as they are subjected to wide variations of temperature and pressure.

The sealing ring 24 is preferably made of stainless steel, for example, the 18 chromium—8 nickel type, which has good corrosive resistance even at high temperatures and which has high ductibility.

As a result of this invention a sealing ring structure has been provided between two fluid containing parts which is liquid and gas tight under widely varying conditions of temperature and pressure and one which is especially adapted for use with corrosive fluids. It will be further evident that the seal above-described is one which is capable of repeated re-use without impairing its sealing function.

While only one embodiment of the invention has been shown and described herein, it will be evident that various changes may be made in the construction and the arrangement of the parts without departing from the scope of the invention. For example, the sealing ring structure described is well suited for use between flanged pipe couplings and the like.

I claim:

1. In a seal ring for a two-part fluid container having confronting annular grooves in said parts the bottom walls of which are flat and parallel and the side walls of which converge toward the bottom walls of said grooves, said seal ring comprising a stainless steel member having a thin web portion adapted to lie perpendicular to the bottom walls of said grooves and integral enlargements at its ends which are annular and somewhat semicircular in cross section and adapted to enter within said grooves, said enlargements having annular recesses formed therein opposite the bottoms of said grooves dividing each of said enlargements into a pair of lobes each of which has a curved surface which engages an inclined side wall of a groove in a continuous narrow annular band, the spacing of the curved surfaces on said pairs of lobes and the width of said grooves being such that when said seal ring is lightly seated in said grooves the ends of the lobes are spaced from the bottom walls of said grooves, means for drawing said container parts together to press said converging side walls against said lobes and to urge the latter toward each other and also into engagement with the bottoms of said grooves, whereby to provide four narrow peripheral bands of continuous engagement between said ring and each part of said container.

2. In a seal ring for a two-part fluid container having in said parts confronting grooves the bottom walls of which are flat and parallel and the side walls of which converge toward the bottom walls, said seal ring comprising a stainless steel member having an annular web perpendicular to the bottoms of said grooves and extending into said grooves, said web having at each end a pair of annular lobes which diverge therefrom and terminate in annular rounded surfaces which engage said side walls, the bases of said lobes where they are joined with said web being of reduced cross sections to provide resilient support for said lobes, said lobes also having annular rounded rims which confront and are engageable with said bottom walls, the spacing of said rounded surfaces on said pairs of lobes and the spacing of the converging side walls being such that when said seal ring is lightly seated in said grooves said rounded rims are slightly spaced from said bottom walls, and means for drawing the parts of said container forcibly together to flex said pairs of lobes toward each other until said rims seat on said bottom walls.

3. In a sealed joint, the combination with two parts to be sealed having confronting annular grooves each of which has side walls which converge toward the bottom of the groove, of an annular stainless steel sealing ring adapted to be positioned in the grooves between the parts, said ring in cross section generally resembling a dumbbell having enlarged end portions connected by a thin web and having annular top and bottom recesses formed in the extremities of said enlarged end portions in position to confront the bottoms of the respective grooves in said parts when said ring is positioned in said grooves, said recesses extending into proximity to said web to provide two annular lobes at each end of the web provided with curved end surfaces which engage the converging side walls of the groove in which they seat, said lobes being resiliently supported on said web as a result of the proximity of said recesses to said web, and clamping means for drawing said parts forcibly toward each other causing the adjacent lobes on each end of said web to be forced toward each other against their inherent resilience as said curved portions on said lobes slide along the converging side walls of said grooves.

4. In a seal for a two-part container having confronting annular grooves in said parts, each of said grooves having a bottom wall and side walls which converge toward said bottom wall, the seal comprising an annular ring of stainless steel adapted to be positioned in the grooves between said container parts, said seal ring in cross section generally resembling a dumbbell having enlarged end portions one of which is receivable in each of said grooves and a thin web connecting said enlarged portions, said end portions each having a deep peripheral recess therein facing the bottom wall of the groove in the container part in which it is located, said recess dividing said enlarged portion into two lobes each of which has a rounded end surface, said rounded surfaces of adjacent lobes engaging the opposite inclined side walls of the groove in which said lobes are received, said lobes being resiliently supported on said web as a result of the proximity of said recesses to said web, the lateral distance between the rounded end surfaces of the lobes at each end of said web relative to the width of said grooves being such that when said pairs of lobes are lightly seated in their respective grooves with their rounded surfaces abutting the converging side walls of said grooves, the lobes are spaced from the bottoms of said grooves, and clamping means for drawing said container parts forcibly toward each other with said seal ring therebetween to flex the adjacent pairs of lobes toward each other as their rounded surfaces slide along said converging side walls until the extremities of said lobes are firmly seated against the bottom walls of said container grooves.

References Cited in the file of this patent

UNITED STATES PATENTS

| | | |
|---|---|---|
| 1,567,813 | Oleson | Dec. 29, 1925 |
| 2,424,449 | Gasche | July 22, 1947 |
| 2,479,612 | Glidden | Aug. 23, 1949 |
| 2,764,311 | Blackman | Sept. 25, 1956 |